United States Patent [19]
Antonaccio

[11] 3,964,047
[45] June 15, 1976

[54] FIRE-ALARM AUDIBLE SIGNALING SYSTEM PERMITTING SELECTIVE COMMUNICATIONS AND SIGNALING

[75] Inventor: Joseph C. Antonaccio, Hazlet, N.J.

[73] Assignee: Wheelock Signals, Inc., Long Branch, N.J.

[22] Filed: June 19, 1974

[21] Appl. No.: 480,867

[52] U.S. Cl. .......... 340/310 R; 340/408; 340/310 A; 340/171 PF

[51] Int. Cl.² .......... H04Q 9/00

[58] Field of Search .......... 340/413, 408, 171 R, 340/163, 152 R, 151, 310 R, 171 PF, 224, 409, 310 A, 351

[56] References Cited

UNITED STATES PATENTS

| | | | |
|---|---|---|---|
| 3,045,210 | 7/1962 | Langley | 340/151 X |
| 3,350,687 | 10/1967 | Gabrielson | 340/163 |
| 3,423,521 | 1/1969 | Friesen | 340/319 X |
| 3,516,063 | 6/1970 | Arkin | 340/163 |
| 3,796,994 | 3/1974 | Nuss | 340/163 |
| 3,803,491 | 4/1974 | Osborn | 340/310 R |

*Primary Examiner*—Harold I. Pitts
*Attorney, Agent, or Firm*—Brumbaugh, Graves, Donohue & Raymond

[57] ABSTRACT

The transmitter of a fire-alarm audible signaling system permitting selective communications and signaling transmits digital command signals to receiver-drivers respectively positioned in a number of fire zones over a single two-wire or three-wire circuit that also provides power to the receiver-drivers. Each command signal includes a frame bit, a zone designator comprising, say, four bits and a function designator comprising, say, three bits. The frame bit is always a one and is always the first bit of the command signal, and it serves as a reference. A comparator in each receiver-driver compares an identification code proper to that receiver-driver with the zone designator of each command signal, and each receiver-driver responds to the function designator of a command signal to perform the designated function only in case of a match between the zone designator of the same command signal and the identification code for that receiver-driver. The system continuously monitors itself to ensure that it is in proper working order, and trouble signals are activated in case of a malfunction. The trouble signals indicate the zone in which a malfunction occurs.

10 Claims, 14 Drawing Figures

FIRE-ALARM AUDIBLE SIGNALING SYSTEM PERMITTING SELECTIVE COMMUNICATONS AND SIGNALING

BACKGROUND OF THE INVENTION

This invention relates to fire-alarm audible signaling systems and, more particularly, to a novel and highly-effective fire-alarm audible signaling system permitting selective communications and signaling between a central control station and a number of fire zones (in a high-rise apartment, for example, where each floor may be designated a separate zone).

U.S. Pat. to Klein et al No. 3,803,594, issued April 9, 1974, discloses digital interrogation of sensors in a fire alarm system from a central location. This system provides the advantage of economical wiring on the input side to the central location but in no way simplifies the wiring of the output side. Thus, on the output side, a separate pair of wires is still required from the fire-alarm control panel (FACP) transmitter to a receiver-driver in each zone, and, in a large system, a large and expensive amplifier is required. Conventional systems having only one pair of wires extending from the transmitter to the receiver-drivers in different fire zones typically lack the ability to activate the receiver-drivers selectively and to perform different functions in different zones. Another deficiency of conventional fire-alarm audible signaling systems is that their means for self-supervision does not sufficiently identify the location of a malfunction.

SUMMARY OF THE INVENTION

An object of the invention is to remedy the major deficiencies of conventional fire-alarm audible signaling systems, including the ones outlined above. In particular, an object of the invention is to provide a fire-alarm audible signaling system having only a small number of wires, for example two or three, from the FACP transmitter to the receiver-driver in each zone, that uses amplifiers of modest size, power and cost, that is able to activate zones selectively and to perform different functions in different zones, and that is fully and automatically supervised by circuitry that apprises the personnel responsible for taking corrective action of the location of a malfunction.

These and other objects are attained in accordance with the invention by a fire-alarm audible signaling system permitting selective communications and signaling and comprising transmitter means for transmitting digital command signals to each of a plurality of fire zones, each of the command signals comprising a zone designator and a function designator, and receiver-driver means in each of the zones for receiving the signals. Each of the receiver-driver means comprises comparator means for comparing an identification code proper to that receiver-driver means with the zone designator of each command signal, and each receiver-driver means responds to the function designator of a command signal to perform the designated function only in case of a match between the zone designator of the same command signal and the identification code for that receiver-driver means.

BRIEF DESCRIPTION OF THE DRAWING

A better understanding of the invention can be gained from a consideration of the following detailed description of the preferred embodiments thereof in conjunction with the appended figures of the drawing, wherein:

FIG. 3B, show schematically a typical receiver-driver in accordance with the invention;

DESCRIPTION OF THE PREFERRED EMBODIMENTS

Figure 1A:
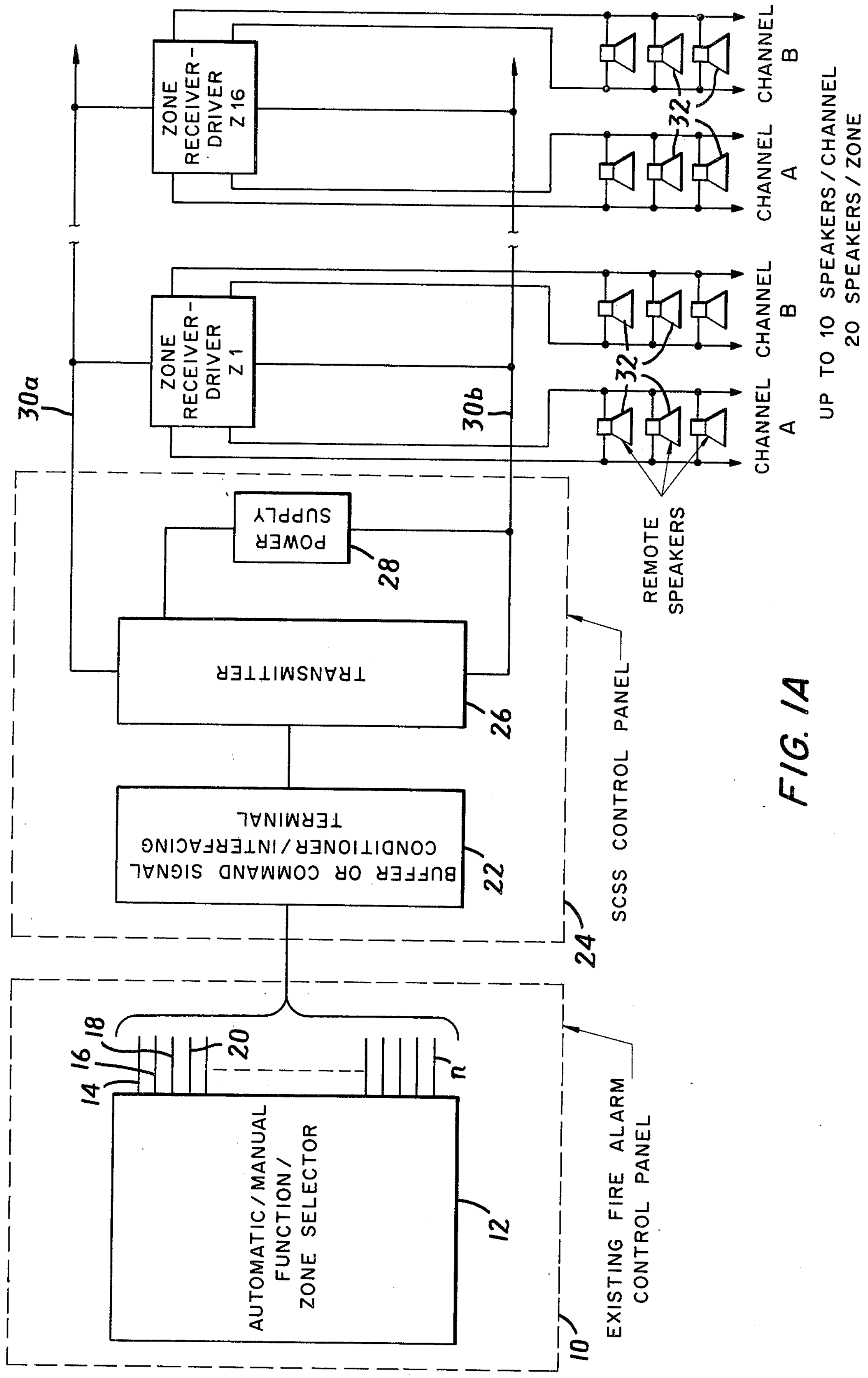
FIG. 1A is a block diagram showing a first representative embodiment of a fire-alarm audible signaling system in accordance with the invention permitting selective communications and signaling between a central transmitter and a number of receiver-drivers respectively arranged in different fire zones (of a high-rise apartment building, for example)

There are FACP's available commercially that generate a signal designating a specific zone of a number of fire zones (in a high-rise apartment, for example) and a function to be performed within that zone (voide communication, "alert" signal, "evacuate" signal, control of vents, etc.). FIG. 1A shows such a fire-alarm control panel 10 comprising an automatic/manual function/-zone selector 12. The present invention in its preferred embodiments is fully compatible with such commercial FACP's. In accordance with the invention, each zone/-function signal generated by the FACP 10 is connected by a separate signal line 14, 16, 18, 20...*n* to the input bus (not shown) of a command signal conditioner/interfacing terminal or buffer 22, which is part of a selective communications and signaling system (SCSS) control panel 24 constructed in accordance with the invention. The number of signal lines 14, 16...*n* needed is equal to the number of zones into which the system is divided times the number of functions the system can be called upon to carry out in each zone. For example, a 16-zone system capable of performing three functions per zone requires $16 \times 3 = 48$ lines into the interfacing terminal or buffer 22.

The interfacing terminal or buffer 22 converts whatever voltage the user has available to a voltage compatible with the circuitry used in accordance with the invention. In the case of transistor-transistor logic (TTL), which is a good choice for constructing apparatus in accordance with the invention, a 5-volt d.c. signal is required. If the user FACP 10 provides a five-volt d.c. signal, then the signals on the lines 14, 16...*n* are supplied directly to a transmitter 26, which is also included within the control panel 24, and the interfacing terminal or buffer 22 is not required.

The transmitter 26 is energized by a power supply 28 and sends digital signals represented by tone bursts of different frequencies to zone receiver-drivers Z1... Z16, etc., over a two-wire line 30*a*, 30*b*. Each zone receiver-driver powers a number of remote speakers 32, divided into two channels A and B in each zone. Typically, up to ten speakers may be provided per channel (i.e., up to 20 speakers per zone).

Figure 1B:
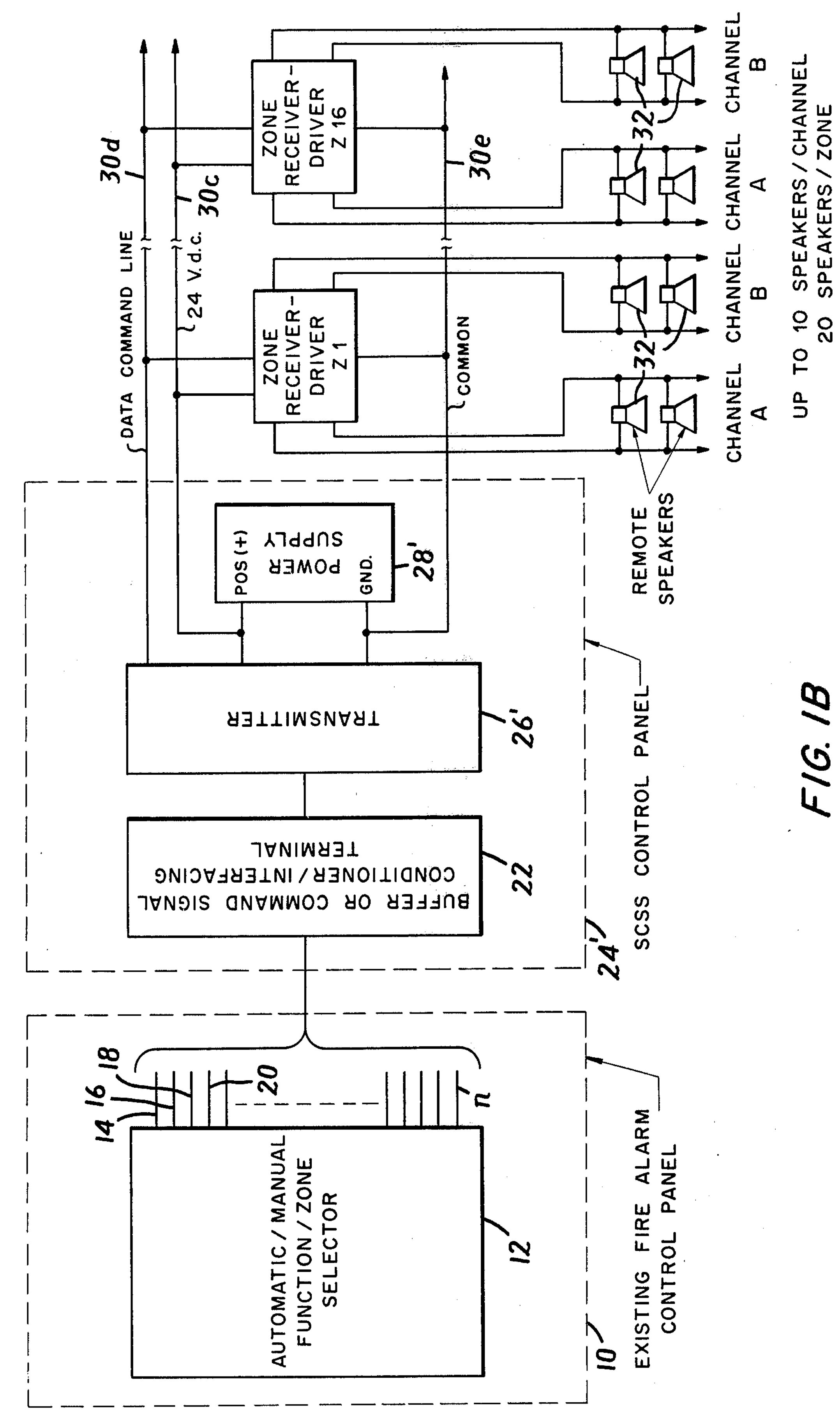
FIG. 1B is a block diagram showing another embodiment of a fire-alarm audible signaling system in accordance with the invention, which differs from the embodiment of FIG. 1A in employing three wires instead of two connecting the central transmitter and the receiver-drivers.
Figure 2A:
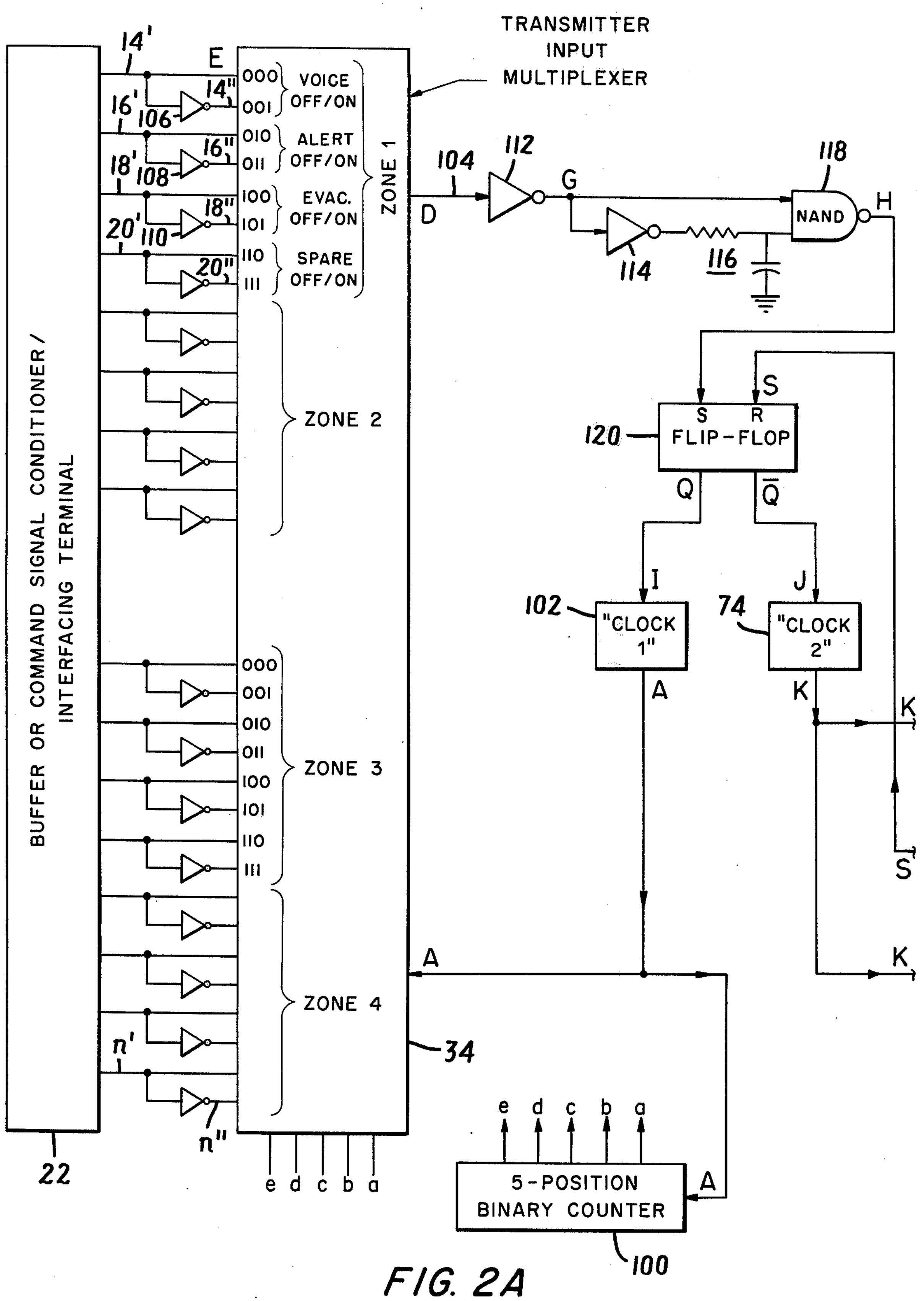
FIGS. 2A and 2B are block diagrams in greater detail than FIG. 1A and, when arranged side-by-side with FIG. 2A to the left of FIG. 2B, show schematically a transmitter (not including the supervisory circuit) in accordance with the invention.
Figure 2B:
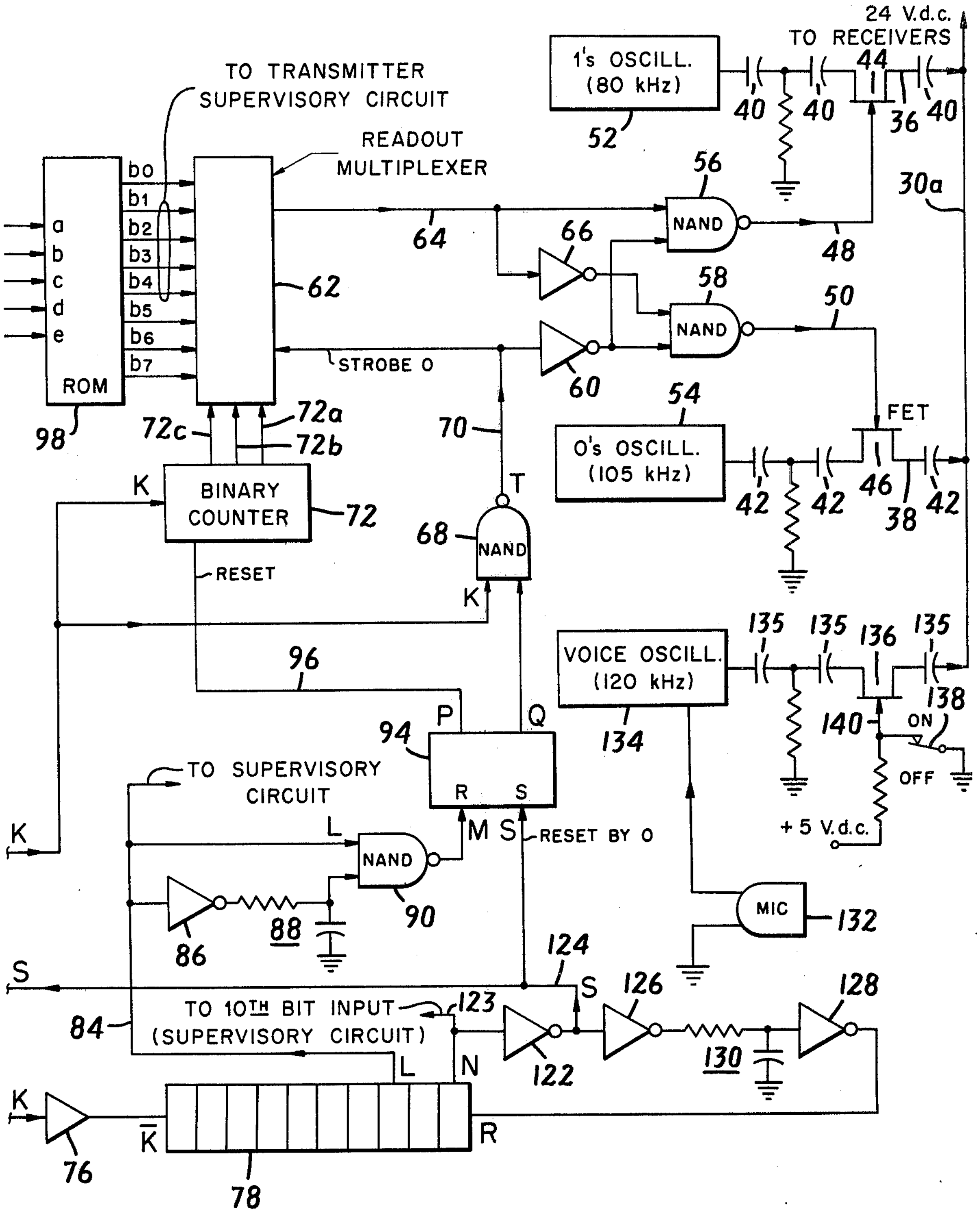

A preferred embodiment of the transmitter 26 is shown in greater detail in FIGS. 2A and 2B. The input to the transmitter 26 is supplied to an integrated-circuit input multiplexer 34 (FIG. 2A) whose mechanical analogy is an N-positive single-pole switch. Each signal-input line 14', 16', 18', 20' ... *n'* (corresponding, respectively, to lines 14, 16, 18, 20 ...*n*) is sequentially sampled to determine if a signal is present or absent. If a signal is present on a sampled input line, indicating a command, the sampling stops, and a coded message is transmitted over a two-wire, 24-volt d.c. line 30*a* (FIG. 2B) supplying all of the zone receiver-drivers Z1...Z16, etc. (FIG. 1). At the end of transmission the multiplexer 34 steps into its next position and continues to sample the signal input lines 14', 16'...*n'*.

It takes approximately 867 milliseconds to strobe all 64 signal input lines of a 16-zone, four-function system. Therefore, in such a system, input signals to the transmitter 26 must be present for a minimum of 867 milliseconds to ensure that a code will be sent to the receiver-drivers Z1...Z16. Transmission time for a coded word is approximately 10 milliseconds.

Voice communication is provided in accordance with the invention. When the "voice on" function for a particular zone is present, the receiver-driver for that zone automatically sets up its demodulators, and a microphone or, for example, a tape recording can be used to transmit voice instructions. Frequently modulation is preferably used to ensure interference-free reception at the receiver-drivers. Frequently response is preferably from about 300 Hz to 8 kHz. This enables voice transmission of adequate fidelity and does not require expensive components.

In accordance with the invention, a coded signal is transmitted to each zone receiver-driver Z1...Z16, etc. The zone receiver-driver in the zone designated by the transmitted code must receive the coded signal, check its own circuits, and reply by sending a signal back to the transmitter. If the transmitter does not receive a signal from the receiver-driver, a supervisory lockout circuit of the transmitter actuates a trouble signal comprising, for example, a light and an audible signal. To improve the confidence level of the trouble signal, several successive failures may be required before the trouble signal is actuated. The audible signal may be manually silenced, but the light cannot be turned off unless corrective action is taken to ensure that the return signal from the addressed zone is present, thus ensuring tamper-proof operation of the system. An important feature of the system is that each zone is represented on the transmitter panel by its own light, so that the location of the malfunction is made known.

Each zone receiver-driver Z1...Z16, etc., contains the circuitry necessary to perform a number of important functions.

First, decoding logic is provided. This portion of the circuitry receives the coded command signal from the transmitter 26 over the two-wire transmission line 30*a*, 30*b*, decodes the command signal, and channels the decoded information to the appropriate functioning circuit. Field-programmable zone receiver-drivers can be provided to facilitate system expansion or to replace a malfunctioning zone receiver-driver already in the field. Programming involves changing the zone number decoder.

Second, each zone receiver-driver is capable of generating a number of distinct audible signals. Typically, at least two such signals are desired, such as an alert signal and an evacuation signal. User requirements may dictate that certain audible signals be hard-wired into a zone receiver-driver and not be field-programmable.

Third, each zone receiver-driver preferably has its own FM demodulator for demodulating a voice signal from the carrier frequency, to permit voice communications with any selected zone.

Fourth, each zone receiver-driver employs circuitry facilitating continuous supervision of the speaker line, amplifiers and logic elements that zone receiver-driver. When a receiver-driver receives its supervisory command signal from the transmitter, that receiver-driver generates a signal and sends it back to the transmitter, thus acknowledging that all circuits within that zone are functioning properly. If a malfunction exists, the supervisory signal is not transmitted, and trouble signals on the control panel are activated after one or several failures to transmit the supervisory signal.

Fifth, each zone receiver-driver is equipped with two audio amplifiers, preferably of about 10 watts each, and a balancing network, which is part of the supervisory system. If a single amplifier fails, this causes a maufunction signal to be generated, as indicated above. However, the second amplifier will continue to operate, thus ensuring that half of the speakers in a zone will still be operative pending repairs. If a great number of speakers, say more than 20, are needed within a single zone, one way they can be provided is by adding another zone receiver-driver to the same zone. This is facilitated by the provision of field-programmable receiver-drivers.

Sixth, in a preferred embodiment of the invention, each zone receiver-driver is powered, and receives its command signals from, the same two-wire or three-wire d.c. line. This line can have any suitable voltage--for example, 24 volts.

The power supply 28 (FIG. 1A) for a 16-zone system having 20 speakers per zone should develop about 600 watts (for example, 25 amperes at 24 volts d.c.). There are existing commercial power supplies that meet this requirement.

Information is sent between the transmitter 26 and the zone receiver-driver Z1...Z16, etc., over the line 30*a*, 30*b* in binary form, ones and zeros being represented by tone bursts of different frequencies. The ones are impressed on the 24-volt d.c. line 30*a* over a line 36 (FIG. 2B), and the zeros are impressed on the 24-volt d.c. line 30*a* over a line 38. Coupling capacitors 40 and 42 prevent the d.c. voltage from feeding back from the line 30*a* to FET switches 44 and 46, respectively, and also provide a low-impedance path for the tone bursts, which have frequencies high enough to be readily passed by the capacitors.

The FET switches 44, 46 are both opened by a digital 1 and closed by a digital 0 applied to control leads 48 and 50, respectively. When they are closed, they connect oscillators 52 and 54 to the lines 36 and 38, respectively, and hence to the 24-volt d.c. line 30*a*. The oscillators 52 and 54 run continuously at different frequencies. For example, the oscillator 52 may run continuously at a frequency of about 80 KHz and the oscillator 54 may run continuously at a frequency of about 105 kHz.

The signal developed by the oscillator 52 represents digital ones, and the signal developed by the oscillator 54 represents digital zeros. Therefore, when the oscillator 52, for example, is connected to the 24-volt d.c. line 30*a* by the closing of the FET switch 44, which occurs when a digital zero is applied to the FET switch 44 over the control lead 48, a tone burst at a frequency of 80 kHz is applied to the 24-volt d.c. line 30*a*, representing a digital one. Similarly, when the oscillator 54 is connected to the 24-volt d.c. line 30*a* by the closing of the FET switch 46, which occurs when a digital zero is applied to the FET switch 46 over the control lead 50, a tone burst at a frequency of 105 kHz is supplied to the 24-volt d.c. line 30*a*, representing a digital zero.

The duty cycle is preferably about 50 percent, and each tone burst preferably lasts for about one-half a millisecond. This permits a transmission rate of about 1,000 bits per second.

At no time can the signal from the ones oscillator 52 and the signal from the zeros oscillator 54 be impressed upon the 24-volt d.c. line 30*a* simultaneously. That is because whenever a digital zero control signal is applied to the FET switch 44, a digital one control signal is applied to the FET switch 46. For example, if a zero is on the control line 48, so that the FET switch 44 is closed and the ones oscillator 52 is connected to the 24-volt d.c. line 30*a*, then a one must be present on the control line 50, so that the FET switch 46 is now open, and the zeros oscillator 54 is disconnected from the 24-volt d.c. line 30*a*. On the other hand, as explained below, it is possible for a one to be present on the control lines 48 and 50 simultaneously, so that no tone burst of either frequency is applied to 24-volt d.c. line 30*a*.

The proper spacing between bits is achieved in the following way. The signal on the control line 48 is derived at a NAND-gate 56, and the signal on the control line 50 is derived at a NAND-gate 58. Each NAND-gate 56, 58 receives two inputs. One comes from an inverter 60. The other, in the case of the NAND-gate 56, is generated by a readout multiplexer 62. The readout multiplexer 62 supplies a signal directly to the NAND-gate 56, on a line 64. The same signal is inverted by an inverter 66, and the inverted signal is supplied to the NAND-gate 58. Therefore, whatever signal, zero or one, is supplied by the readout multiplexer 62 to the NAND-gate 56, the complement, one or zero, is supplied to the NAND-gate 58.

A strobe zero derived at a NAND-gate 68 on a strobe line 70 allows the readout multiplexer 62 to present data on the line 64. This same strobe zero is inverted by the inverter 60 and becomes a one at the other inputs to the NAND-gates 56 and 58. With a one present at one input to each of the NAND-gates 56 and 58, the data bits on the line 64 are allowed to pass through the gates 56, 58. Because the data bits on the line 64 are inverted by the inverter 66, when a zero is passed by the NAND-gate 56 to the control line 48, a one is present on the control line 50. Similarly, with a zero on the line 50, a one is on the line 48. Accordingly, it is impossible for both of the FET switches 44 and 46 to be on at the same time, although both can be off at the same time.

The data bits on the line 64 are selected from the multiplexer 62 by a three-position binary counter 72. The three output leads 72*a*, 72*b*, 72*c* of the binary counter 72 enable selection of any of $2^3 = 8$ inputs $b_0$ through $b_7$ to the multiplexer 62. For example, if the output from the binary counter 72 is 000, the data bit on the line $b_0$ will be selected and presented on the line 64, and, if the output from the binary counter is 001, the data bit on the line $b_1$ will be selected and presented on the line 64, etc. The strobing always begins with $b_0$ and proceeds sequentially through $b_7$.

Figure 5:
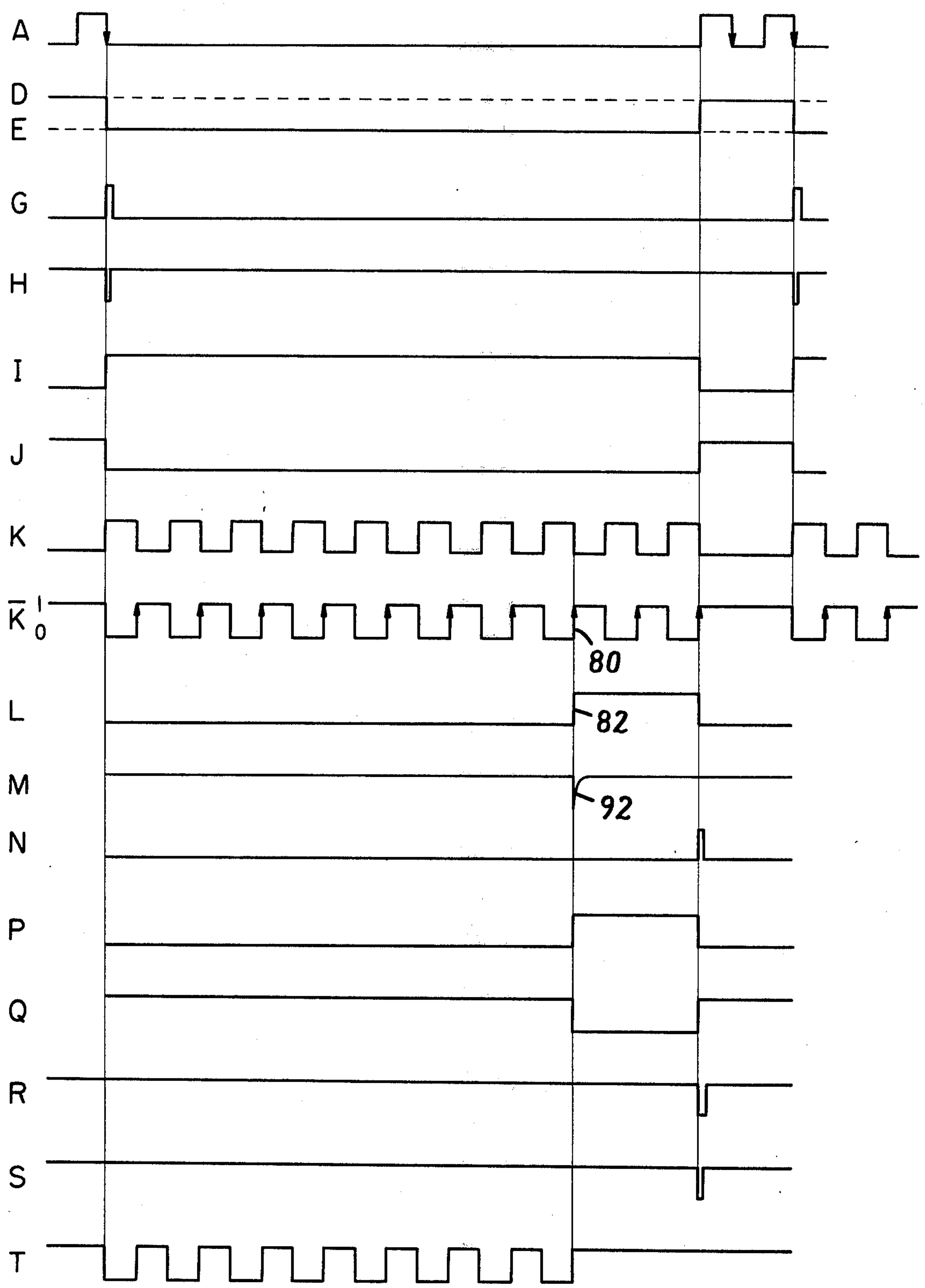
FIG. 5 is a timing diagram showing the timing relationships that exist among various signals generated in accordance with the invention.

The count of the binary counter 72 is caused to advance by a signal K (see also FIG. 5, the timing diagram) from a clock 74 ("clock 2" in FIG. 2A). Each pulse K shown on the timing diagram causes the count to advance by one. At the same time, the pulse K is inverted by an inverter 76 (FIG. 2B) to become the complement K, which is supplied to a 10-bit shift register 78. After eight such pulses, a positive-going signal represented by the line 80 in the timing diagram (FIG. 5) causes signal L to go high, as represented by a line 82 in the timing diagram. The signal L, on a line 84, is inverted by an inverter 86 and applied with a slight delay, caused by a resistor-capacitor circuit 88, to a NAND-gate 90. It is also applied uninverted to the NAND-gate 90, thereby producing a momentary spike 92 in signal M, which is the output, shown in the timing diagram (FIG. 5), of the NAND-gate 90.

The negative-going spike 92 of signal M sets a flip-flop 94, which then causes the output signal P (FIG. 5) to go high on a line 96. This resets the binary counter 72 to zero. At the same time, the output Q of the flip-flop 94 goes low, and therefore the output of the NAND-gate 68 goes high, removing the strobe to the multiplexer 62 and preventing the multiplexer from supplying any signal output to the line 64 (the output on the line 64 becomes continuously high).

Prior to the time when the flip-flop 94 changes states as described above, each pulse K from "clock 2" (FIG. 2A) enables the NAND-gate 68 (FIG. 2B) so that a strobe of the multiplexer 62 is produced with each pulse; after the change of state of the flip-flop 94, it is impossible to obtain a strobe of the multiplexer 62, because of the inhibiting effect of the Q signal from the flip-flop 94.

As indicated above, in accordance with the count of the binary counter 72, the multiplexer 62 selects the signals $b_0$ through $b_7$ for output on the line 64. These signals $b_0$ through $b_7$ come from a "32-by-8" read-only memory (ROM) 98. The ROM 98 stores 32 words each having eight bits and has five control inputs to which are applied signals *a*, *b*, *c*, *d*, and *e*. These input signals enable selection of any one of the $2^5 = 32$ words in the ROM 98. The eight bits of each selected word are presented at the outputs as signals $b_0$ through $\mathbf{b}_7$, respectively.

The signals a through e are generated by a five-position binary counter 100 (FIG. 2A) in response to pulses A (FIG. 5) generated by a clock 102 ("clock 1"). The pulses A are generated as indicated in the timing diagram, and the output a of the five-position binary counter 100 is generated with the first pulse A and applied simultaneously to the ROM 98 (FIG. 2B) and the transmitter input multiplexer 34 (FIG. 2A), which produces a signal output D, on a line 104. In the example given, where the multiplexer 34 is switched by five control inputs a through *e*, it is capable of selecting the data present at any of $2^5 = 32$ data inputs and supplying on the line 104 an output signal D, which is a 1 or a 0 depending on the data bit present at the selected input. The D output is the complement of the signal E (see also the timing diagram) present on the selected data input line. For example, if the signal E present at the data input 14' is a 1, then the output D on the line 104 is 0 and vice versa.

The data bits present at each of the input lines 14'. 16', 18', etc., are inverted by inverters 106, 108, 110, etc., respectively, so that the multiplexer 34 receives two inputs for each signal present on the lines 14', 16', 18', etc., one of these inputs being the complement of the other. One represents the "off" command and the other represents the "on" command. For example, the signal on the line 14' may represent "voice off" and the signal on the line 14'' may represent "voice on." Therefore, for each of the functions of which the system is capable, there is always an input "off" or "on∞ to the multiplexer 34. The 32 inputs 14', 14''; 16', 16''; 18', 18'', etc., thus represent 16 command functions which are divided into four zones 1 through 4, each having four functions.

In a typical commercial embodiment, there might be, for example, 16 zones, as indicated in FIG. 1A, each with four functions so that there would be $4 \times 16 = 64$ command functions requiring altogether 128 individual data inputs and seven control inputs (since $2^7 = 128$) to the multiplexer 34. The user, however, would see only 64 lines, or half the total number of actual inputs to the multiplexer. As explained above, the signals on the lines 14, 16, 18, etc., and hence on the lines 14', 16', 18', etc., are generated, directly or indirectly, by user-controlled circuitry shown schematically at 12 in FIG. 1A, so that the user can select any zone and any command function within that zone.

The multiplexer 34 is strobed by the signal A from "clock 1." The output D at the left of the timing diagram (FIG. 5) is shown as negative-going, meaning that a particular function, which might be, for example, "voice on," is desired (in zone 1, for example). With the signal a present at the control input to the multiplexer 34, assume that a "voice on" signal appears on the input line 14'', which is the second input position to the multiplexer 34.

If the signal D is positive-going, then the transition from the output of an inverter 112 is negative-going, and the output of an inverter 114 is positive-going, but with a delay because of a resistor-capacitor delay circuit 116. This means that a NAND-gate 118 produces no output to set a flip-flop 120. On the other hand, if the signal D is negative-going, then the inverter 112 produces a positive-going signal G, as shown in the timing diagram, and the inverter 114 produces a negative-going signal but with a delay because of the resistor-capacitor delay circuit 116. The delay produces a sharp negative-going spike H (FIG. 5), which sets the flip-flop 120, stops "clock 1", and starts "clock 2."

If the spike H is not produced, so that the flip-flop 120 is not set, "clock 1" continues to produce pulses A, so that the counter 100 continues to step to successive positions and the multiplexer 34 continues to sample the inputs until a command function is detected. When the flip-flop 120 is set by signal H, "clock 2" (FIG. 2A) starts and produces the signals K to step the binary counter 72 (FIG. 2B) and to produce the signals K that fill the register 78 with successive positive signals until position L is reached as described previously. As the signals K are generated, the digital information in the form of tone bursts is supplied to the 24-volt d.c. line 30*a* from the multiplexer 62 under the control of the binary counter 72 as previously described. This means that the multiplexers 34 and 62 (FIGS. 2A and 2B, respectively) are "slaved" to the five-position binary counter 100 (FIG. 2A) so that synchronism is achieved between the information that is supplied to the 24-volt d.c. line 30*a* (FIG. 2B) and the command inputs to the multiplexers 34 and 62.

When it is activated, "clock 2" (FIG. 2A) always produces ten digital pulses. Through position eight in the shift register 78 (FIG. 2B), this results in supplying the information from the ROM 98 to the d.c. line 30*a* in the form of tone bursts having eight bits per word. The last two clock pulses cause the leading or frame bit to assume successively the ninth and tenth positions in the register 78. This results in blanking, so that no information is transmitted by the transmitter 26 on the 24-volt d.c. line 30*a*. It is during this blanking interval that a transmission signal can be received from the zone receiver-driver of the zone addressed for supervisory purposes to be described later.

At the tenth position of the shift register 78, a signal N (see also FIG. 5) goes positive on a line 123, since the leading or frame bit is always high. The signal N enables four functions to be carried out. First, the signal N is inverted by the inverter 122, as explained above, to produce the negative signal S on the line 124 which resets the flip-flop 120 (FIG. 2A) to stop "clock 2" and start "clock 1" so that the multiplexer 34 is strobed and continues to sample its inputs successively. Second, the signal S resets the flip-flop 94 (FIG. 2B). This enables the strobe on the line 70 for the next cycle. (However, the strobe is not immediately present because "clock 2" (FIG. 2A) is turned off and there is no signal K present at the input to the NAND-gate 68 (FIG. 2B).) Third, the register 78 is reset. This is accomplished by inverting the signal S by means of an inverter 126 to produce a signal which is again inverted, by an inverter 138, after a delay caused by a register-capacitor circuit 130. The output of the inverter 128 is a negative signal R (see also FIG. 5) that is supplied to the reset terminal of the shift register 78. The fourth function is described later in connection with the supervisory circuit.

To summarize, after every eight transmitted bits there is a pause equal to the time taken for the transmission of two bits. During this pause, the transmitter supervisory circuit described later should receive back information from the receiver-driver addressed that enables it to determine that the system is in proper working order. If the expected information is not received back, a trouble signal is actuated as described later.

For voice communication, a microphone 132 is provided, which is grounded and connected to a voice oscillator 134. This oscillator may have a central frequency of, for example, 120 kHz. The output is frequency-modulated plus or minus 5 kHz, for example, and is supplied through isolating capacitors 135 to the 24-volt d.c. line 30*a* when an FET switch 136 is gated on. The FET switch 136 is controlled by a switch 138, which when closed connects a 5-volt d.c. supply to ground and supplies a zero to the control lead 140 of the FET switch 136. When the switch 138 is closed, the digital zero supplied to the FET switch 136 causes the voice oscillator 134 to be connected to the 24-volt d.c. line 30*a*. The audio signals from the microphone 132 then modulate the carrier frequency in the usual way.

Figure 3A:
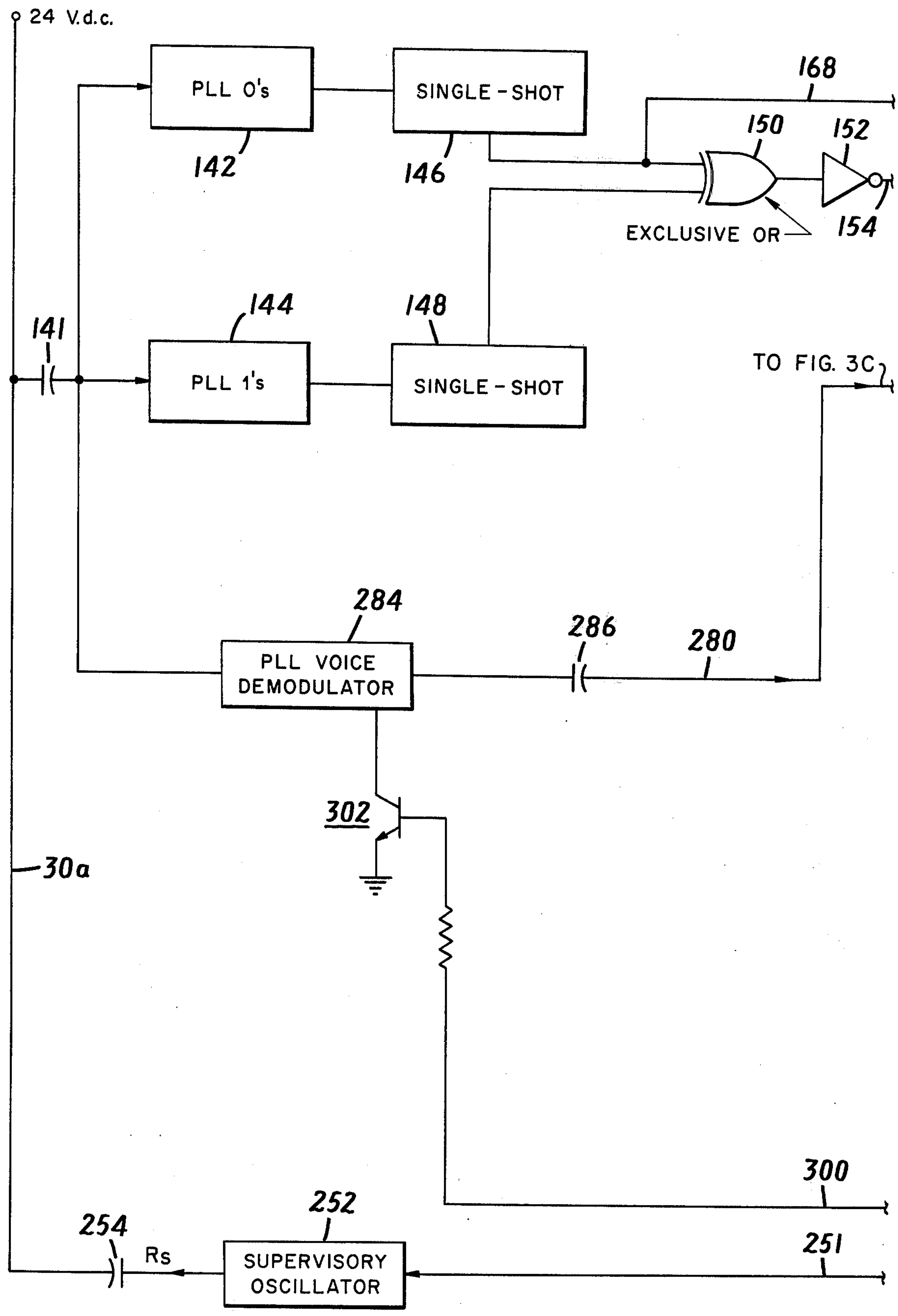
FIGS. 3A, 3B and 3C are block diagrams in greater detail than FIG. 1A and, when arranged with FIG. 3A to the left of FIG. 3B and with FIG. 3C alternately to the right of and below
Figure 3B:
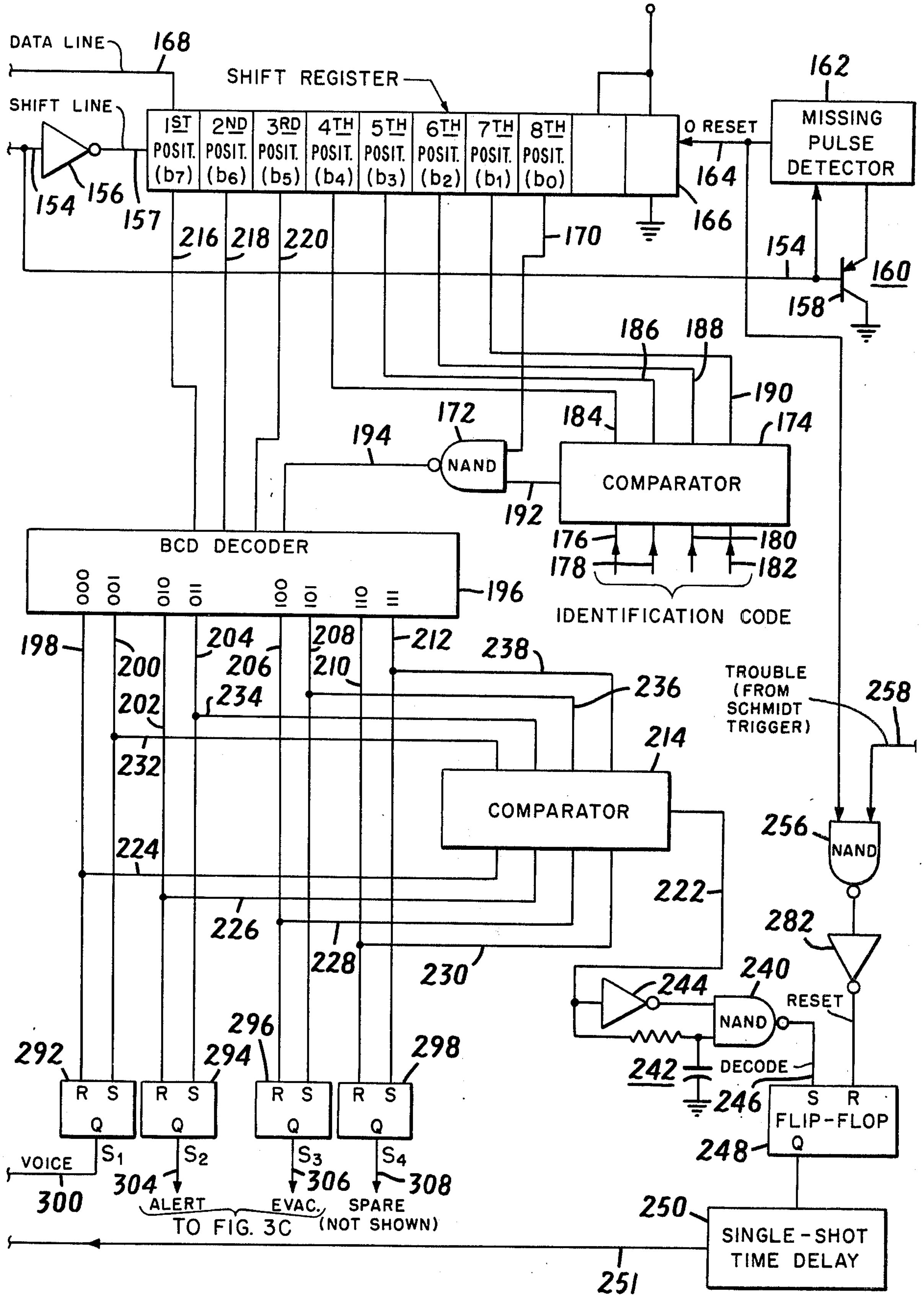
Figure 3C:
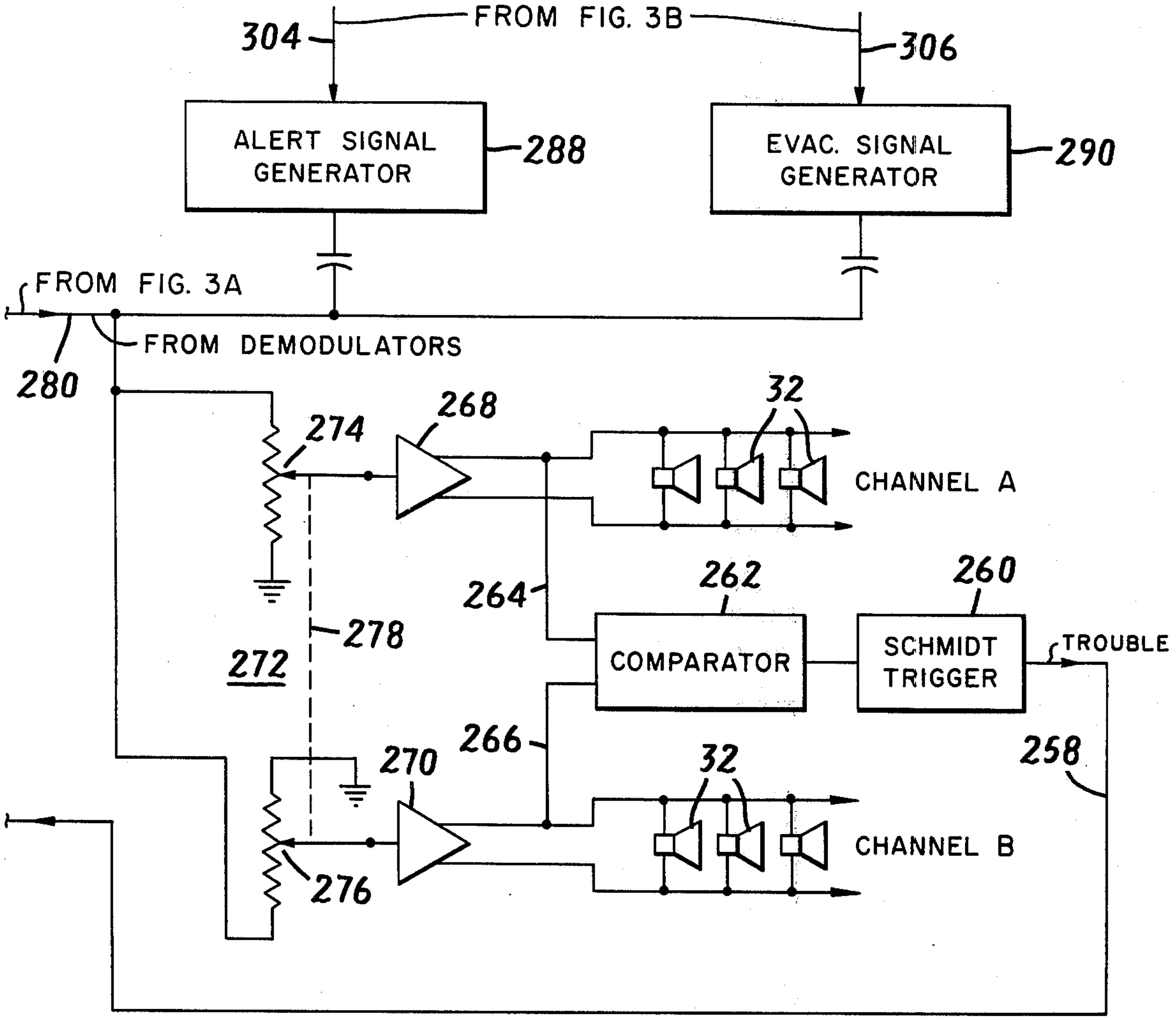

We will consider next the zone receiver-drivers, a typical one of which is shown in FIGS. 3A–3C. The 24-volt d.c. line 30*a* shown at the right of the transmitter drawing (FIGS. 2A and 2B) is shown at the left of FIG. 3A. The tone bursts or the voice modulation signals, as the case may be, are transmitted from the transmitter 26 to the zone receiver-driver illustrated and to the other zone receiver-drivers (FIG. 1) supplied by the 24-volt d.c. line 30*a*. In addition, the supervisory signal in the form of tone bursts at a different frequency is transmitted from the responding zone receiver-driver back to the transmitter on the same 24-volt d.c. line 30*a*. The responding receiver-driver is of course the one that has decoded the eight-bit word transmitted on the 24-volt d.c. line 30*a*. Moreover, the 24-volt d.c. line 30*a* supplies all of the power for each zone receiver-driver.

The tone bursts appearing on the 24-volt d.c. line 30*a* pass through a capacitor 141 and are demodulated by phase-locked loops 142 and 144 (FIG. 3A). The phase-locked loop 142 demodulates the tone bursts representing digital zero, and the phase-locked loop 144 demodulates the tone bursts representing digital one. The phase-locked loop 142 produces on output to a single-shot or retriggerable monostable multivibrator 146. The monostable multivibrator 146 prevents jitter or chatter: it operates on the first negative transmission and stays low for one-half a millisecond; during this period no further triggering is possible. Similarly, the output of the phase-locked loop 144 is supplied to a single-shot or monostable multivibrator 148 having the same properties as the monostable multivibrator 146.

The multivibrators 146 and 148 supply inputs to an EXCLUSIVE OR-gate 150. The EXCLUSIVE OR-gate 150 produces a positive output when the inputs are different: that is, when one input is a digital zero and the other is a digital one. If the inputs are the same, that is, if both are digital ones or if both are digital zeros, it produces a zero output.

The output of the EXCLUSIVE OR-gate 150 is inverted by an inverter 152. The output of the inverter 152 is supplied on a line 154 to an inverter 156 (FIG. 3B), which produces a signal on a shift line 157 connected to a shift register 166. The output of the inverter 152 is also supplied by the line 154 to the base 158 of a PNP transistor 160. When the signal to the base 158 is negative, the transistor 160 is gated on.

The signal on the line 154 is also supplied as an input to a timer 162, which functions as a missing-pulse detector. Each time the detector 162 receives a pulse, it is held in a set position and is not allowed to generate a reset pulse on a line 164. If one of the expected pulses on the line 154 is missing, the detector 162 times out (goes low) and resets the shift register 166.

The monostable multivibrator 146 (FIG. 3A) also produces an output on a data line 168 connected to the data-input terminal of the shift register 166 (FIG. 3B). The data bits on the line 168 correspond to the digital zeros generated by the phase-locked loop 142 (FIG. 3A) and are entered into the shift register 166 under the control of pulses appearing on the shift line 157. The pulses on the shift line 157 are positive pulses, since the operative outputs from the EXCLUSIVE OR-gate 150 (FIG. 3A) are positive, and these outputs are inverted twice, once by the inverter 152 and once by the inverter 156 (FIG. 3B). The EXCLUSIVE OR-gate 150 and the inverters 152 and 156 have inherent delays so that, by the time a shift pulse appears on the shift line 157, the data bit to be entered is waiting at the input terminal to the shift register 166. During eight successive positive pulses on the shift line 157, data bits are entered successively in the first eight positions of the shift register 166.

The leading bit ($b_0$, the frame bit) in each word transmitted by the transmitter is always a one. When the frame bit $b_0$ arrives in the eighth position of the shift register 144 (FIG. 3B), a positive output read signal is generated on a readout line 170. This signal is supplied to a NAND-gate 172 to enable the gate.

A bit-for-bit comparator 174 has as an input on each of lines 176, 178, 180, 182, respectively, a digital zero or one. This binary code can be either hard-wired or field-programmable. The important point is that each of the zones is designated by a different zone code, so that the comparator 174 will respond only to its particular code; the corresponding comparator for the other zones are wired or programmed in such a way that they will not respond to the same zone code.

The other inputs to the comparator 174 are whatever data bits $b_1$, $b_2$, $b_3b_4$ are present in the seventh through fourth positions of the shift register 166. These outputs appear on lines 184, 186, 188 and 190, respectively. If the data bits on the four pairs of inputs to the comparator 174 are not the same bit-for-bit, a zero signal is produced on the output line 192, which supplies the other input to the NAND-gate 172. The NAND-gate 172 then has a digital one on one input and a digital zero on the other and generates a digital one output on a line 194, which inhibits a binary-code-decimal-to-decimal decoder 196.

When the binary-coded-decimal-to-decimal decoder 196 is inhibited by a digital one on the line 194, all of the outputs appearing on lines 198 through 212 are high, and the output of a bit-for-bit comparator 214 is a digital one. On the other hand, if the signals in positions four through seven of the shift register 166 (appearing on the output lines 184 through 190) match the preprogrammed signals on the lines 176 through 182, then a digital one appears on the line 192 as an input to the NAND-gate 172. Under this condition, the NAND-gate 172 produces a digital zero on the line 194, which strobes the decoder 196. When the decoder 196 is thus enabled, the input bits $b_5$, $b_6$, $b_7$ in positions three through one, of the shift register 166, corresponding to the function code, appear as signals on output lines 220, 218, and 216 which serve to select one of the output lines 198 through 212 and make the signal on the selected line a zero. (Three input binary signals can select any of eight output lines, since $2^3 = 8$. ) In that case, the output of the comparator 214, on a line 222, becomes zero, since the inputs to the comparator 214 on lines 224, 226, 228 and 230 do not match bit-for-bit the inputs to the comparator on lins 232, 234, 236 and 238, respectively.

The digital zero on the line 222 is supplied to a NAND-gate 240, but with a slight delay because of a resistor-capacitor circuit 242. The digital zero is also inverted by an inverter 244, and a digital one is supplied without any appreciable delay to the other input to the NAND-gate 240. This results in the momentary appearance of a digital one at both inputs to the NAND-gate 240 and the momentary appearance of a digital zero at the output 246 of the NAND-gate 240. This momentary zero spike sets a flip-flop 248, which gates on a single-shot or monostable multivibrator 250. The multivibrator 250 produces an output on a line 251 through an oscillator 252 (FIG. 3A) and a coupling capacitor 254 to the 24-volt d.c. line 30*a*. In this way, a signal is transmitted back to the transmitter showing that one of the zone receiver-drivers has decoded the eight bits that were transmitted by the transmitter and present on the d.c. line 30*a*.

The reset signal from the missing-pulse detector 162 (FIG. 3B) appearing on the line 164, which is supplied to the shift register 166, is also supplied as one input to a NAND-gate 256. The other input to the NAND-gate 256 is supplied on a line 258 from a Schmidt trigger 260 (FIG. 3C). The Schmidt trigger 260 is supplied by the output of the comparator 262. The two inputs to the comparator 262 are supplied on lines 264 and 266. The lines 264 and 266 are connected to the outputs of amplifiers 268 and 270, respectively, which drive speakers 32 arranged in parallel in separate channels A and B of the selected (addressed) zone receiver-driver, as also shown in FIG. 1A.

The comparator 262 (FIG. 3C) compares both the amplitude and phase of the outputs from the amplifiers 268 and 270. If these signals differ as to either amplitude or phase, the comparator 262 generates a signal which causes the Schmidt trigger 260 to produce a digital zero, indicating that there is a malfunction in either of the channels. The malfunction could be in the speakers, in a speaker line, or in one of the amplifiers.

The amplifiers 268 and 270 are preliminarily brought into balance with all of the speakers 32 working by an adjustment represented schematically at 272. This may take the form of two potentiometers 274 and 276 that are mechanically coupled together as indicated by a broken line 278 so that an adjustment of one towards increasing resistance results automatically in an adjustment of the other towards decreasing resistance. The inputs to the potentiometers 274 and 276 are from an audio line 280.

When a digital zero reset signal appears on the line 164 (FIG. 3B) or when a zero appears on the line 258, indicating a defect or out-of-balance condition in the speakers 32, the speaker lines or the amplifiers 268 and 270, the output of the NAND-gate 256 becomes a digital one, and the output of an inverter 282 becomes a digital zero, resetting the flip-flop 248 and preventing the monostable multivibrator 250 from gating on the oscillator 252 (FIG. 3A). The transmitter then does not receive back a signal indicating decoding by the receiver-driver. This actuates a trouble signal in a manner explained in detail below.

A demodulator 284 (FIG. 3A) has a center operating frequency corresponding to that of the FM modulator 134 (FIG. 2B) of the transmitter. The demodulator 284 demodulates this signal and produces an audio signal corresponding to the speech or other sound that modulated the FM transmitter, and this audio signal is passed through a capacitor 286 (FIG. 3A), onto the audio line 280, and into the audio amplifiers 268 and 270 (FIG. 3C).

The demodulator 284, an "alert" signal generator 288, and an "evacuate" signal generator 290 are turned on and off by three flip-flops 292, 294 and 296, respectively (FIG. 3B). A further flip-flop 298 controls a "spare" function, such as remote control of vents (not illustrated). The flip-flops 292–298 are controlled in accordance with the data bits $b_5$, $b_6$, $b_7$ in the first three positions of the shift register 166 when the leading or frame bit $b_0$ is in the eighth position. As explained above, assuming a strobe supplied by the NAND-gate 172, the signals on the lines 216–220 then select one of the lines 198–212 and cause the signal on the selected line to go low (i.e., to become a digital zero). The signals on the remaining lines 198–212 remain high. The digital zero on the selected line sets or resets, as the case may be, the corresponding one of the flip-flops 292–298, which turns the controlled function (voice, alert, evacuate, spare, respectively) off or on in accordance with the binary table set forth on the drawing of the decoder 196 (FIG. 3B) and of the multiplexer 34 (FIG. 2A). For example, if $b_5$, $b_6$ and $b_7$ are 000 in the first three positions of the shift register 166 (FIG. 3B) a low signal appears on line 198 and results in "voice off"; if $b_5$, $b_6$ and $b_7$ are, respectively, 001 in the third through first positions of the shift register 166, a low signal appears on line 200 and results in "voice on"; if $b_5$, $b_6$, $b_7$ are, respectively, 010 in the same three positions, a low signal appears on line 202 and results in "alert off," etc.

Thus, a zero signal on the line 200 (FIG. 3B) sets the flip-flop 292 and produces a high output on a line 300, which closes an NPN transistor 302 (FIG. 3A) and gates on the demodulator 284. Similarly, high signals on output lines 304, 306, 308 turn on the "alert" signal generator 288 (FIG. 3C), the "evacuate" signal generator 290, and the "spare" function generator (not illustrated).

As the timing diagram (FIG. 5) and transmitter drawing (FIG. 2B) show, the signal L is generated at the end of every eight-bit word transmitted. The signal N is also generated at the end of every eight-bit word transmitted, but the latter signal is delayed by about 2 milliseconds with respect to the signal L (the delay being measured with respect to the leading edges of the respective pulses).

The supervisory return signal $R_s$ is generated by the oscillator 252 (FIG. 3A) of the activated (addressed) zone receiver-driver only in response to the simultaneous fulfillment of the following conditions:

1. A full eight-bit word must have been received in the shift register 166 (FIG. 3B) of the addressed zone receiver-driver, and the frame bit must have arrived at the eighth position of the shift register.

2. The comparator 174 must determine that the zone code portion $b_1$, $b_2$, $b_3$, $b_4$ of the command signal, stored in the seventh, sixth, fifth and fourth positions of the shift register 166, agrees with the pre-programmed code stored locally and designating that particular zone.

3. One of four legitimate functions (eight, counting "off" and "on" as separate functions) must be designated by the code $b_5$, $b_6$, $b_7$ stored in the third, second and first bit positions of the shift register 166 (voice off, voice on, ..., spare off, spare on).

4. A word must actually have been decoded, and a functional output from the binary-coded-decimal-to-decimal converter 196 must have been detected.

5. The loudspeakers 32, amplifiers 268 and 270 and lines proper to the activated zone receiver-driver must all be in working order and in balance (FIG. 3C).

In operation, the five-position counter 100 (FIG. 2A) receives a first pulse A from "clock 1". If an input is present on the line 14' supplying the multiplexer 34, "clock 1" stops, and "clock 2" causes the eight-bit word selected from the ROM 98 (FIG. 2B) to be read out, as explained above. At the end of transmission of the eight-bit word, signal L (FIG. 2B) causes a shift register 310 (FIG. 4) in the transmitter supervisory circuit to store a count in the first position.

If all of the conditions (1) through (5) listed above are met for the addressed zone receiver-driver, signal $R_s$ on line 30*a* will be processed by a phase-locked loop 312 (FIG. 4), and a monostable multivibrator 314 and will cause a count to be stored in the first position of a shift register 316 in less than two milliseconds. Within two milliseconds after the signal L is generated, the signal N appears at an AND-gate 318. However, since the fourth position of the shift register 310 is still low, the gate 318 has one low input and therefore a low output.

Inputs $b_1$, $b_2$, $b_3$, $b_4$ from the ROM 98 (FIG. 2B), which represent the addressed zone, are supplied to a binary-coded-decimal-to-decimal decoder 320 (FIG. 4) to specify the zone by which the eight-bit word was decoded.

Following signal N, "clock 2" (FIG. 2A) stops, as explained previously, and "clock 1" advances the five-position binary counter 100 to its next count. This is still in the same zone, since, in the representative embodiment of the invention disclosed, there are always four command signals transmitted in each zone pass.

Figure 4:
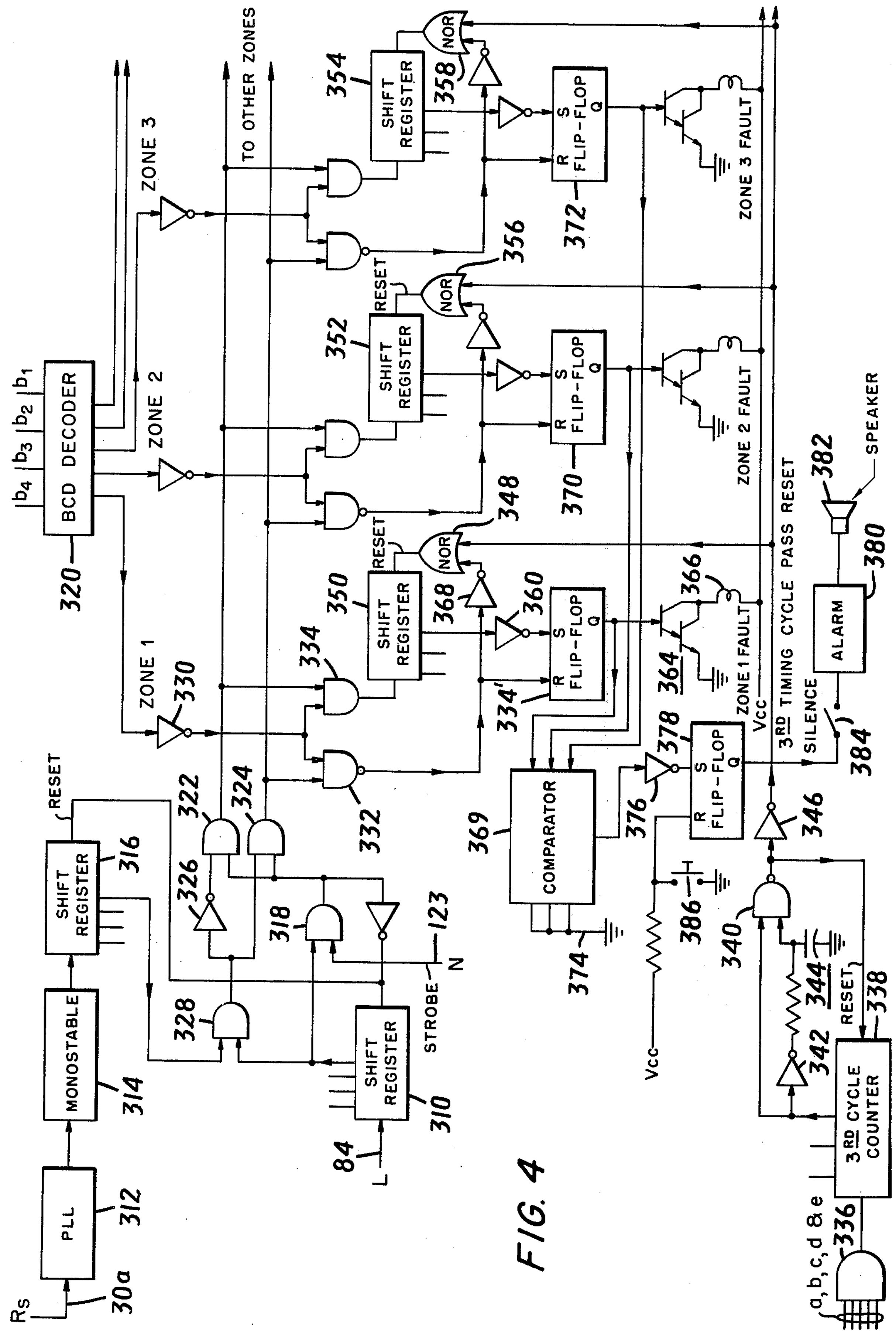
FIG. 4 is a block diagram showing schematically a supervisory circuit in accordance with the invention.

This process is repeated, assuming a properly decoded word, until the fourth command signal within the zone pass is selected at the multiplexer 34 (FIG. 2A). Eight bits are transmitted, and then signal L appears and forces the fourth position high on the register 310 (FIG. 4). With the fourth position high, and AND-gate 318 is ready to be activated by the signal N (FIGS. 2B and 4) when it appears.

If the addressed zone is operating properly and the five tests set forth above are met, the signal $R_s$ is received (FIG. 4), forcing the fourth position high in the register 316. Two milliseconds after the signal L appears, the signal N appears, as indicated above. The gate 318 output then goes high. AND-gates 322 and 324 complement each other because of an inverter 326. Since both of the registers 310 and 316 are assumed to be high in the fourth position, an AND-gate 328 will go high. The inverter 326 inverts the signal from the gate 328 and produces a low output, applied to the gate 322. The signal output from the gate 322 is therefore low while signal N is present, and the signal output from the gate 324 is high while N is present.

If the addressed receiver-driver is in zone 1, then the bits $b_1$, $b_2$, $b_3$, and $b_4$, which designate the zone, will be, respectively, 0000. The binary-coded-decimal-to-decimal converter 320 (FIG. 4) in that case produces a low output to an inverter 330, which inverts the signal and produces a high signal which is applied to a NAND-gate 332 and an AND-gate 334 during the entire cycle. While the signal N is present, the signal from the gate 322 is low. This signal is applied to the gate 334, so that the output from the gate 334 remains low. The high signal from the gate 324 is applied to the gate 332 and causes the output of the gate 332 to go low. A flip-flop 334' then resets, causing its output signal Q to be low.

Let us assume that there are no failures for three successive cycles. In that case, the process described above is repeated during three successive cycles. At the third time when the five-position counter 100 (FIG. 2A) has all high outputs *a*, *b*, *c*, *d* and *e*, an AND-gate 336 (FIG. 4) produces a third pulse into a shift register 338, which functions as a third-cycle counter, and the third position of the counter 338 goes high.

The high third-position output of the cycle counter 338 is applied immediately to one input to a NAND-gate 340. The high signal is inverted by an inverter 342, and the resulting low signal is applied to the other input to the NAND-gate 340, but only after a delay caused by an R-C circuit 344. Momentarily there are thus two high inputs to the gate 340, and this causes a momentary negative-going signal into an inverter 346 and into the reset terminal of the cycle counter 338. The cycle counter 338 is thus reset so that all of its outputs are low. The inverter 346 produces an output that is momentarily high but then becomes negative-going as the NAND-gate 340 resumes its high state upon discharge of the R-C circuit 344. A NOR-gate 348 receives this negative-going output and produces an output that resets a shift register 350. The other shift registers 352, 354, etc., are reset similarly by NOR-gates 356, 358, etc., and at the same time. All of the outputs of the shift registers 350–354, etc., are then low.

The apparatus continues to cycle through the fourth cycle, the fifth cycle, etc. Let us now assume that there is a failure in zone 1 during each of these cycles and that the signal $R_s$ is not received by the supervisory circuit. It is within the scope of the invention to actuate a trouble signal immediately: i.e., upon the failure in the fourth cycle. Preferably, however, failure during several successive cycles is required to actuate the trouble signal, in order to increase the confidence level of the trouble signal. Because of the rapidity of the interrogation, the delay is inconsequential.

In the embodiment of the invention illustrated in FIG. 4, the failure in the fourth cycle means that the shift register 316 will not have a high signal on its fourth output position. Accordingly, when the signal N appears, the output from the gate 328 will be low. The inverter 326 will then produce a high output, as will the gate 322. This causes the gate 334 to produce a high output and the shift register 350 to store a one in its first position. All of this occurs during the fourth cycle. If the zone-one failure continues during the fifth cycle, the shift register 350 in a similar way stores a one in its first and second positions. If the zone-one failure is still present during the sixth cycle, then the shift register 350 stores a one in its first, second and third positions. Meanwhile, the third-cycle counter 338 produces an output on the sixth cycle that is effective as explained above to reset the shift register 350, but with a delay because of the R-C circuit 344. This delay is sufficient to allow the high signal in the third position of the shift register 350 to cause an inverter 360 to go low, setting the flip-flop 334′ and actuating transistors 364 to cause a light 366 to turn on. The only way for the light 366 to be extinguished, once it is turned on, is for the signal $R_s$ to be received, thereby causing the NAND-gate 332 to develop a signal that resets the flip-flop 334 and permits Q to go low. The same signal from the NAND-gate 332 is applied to an inverter 368, which inverts the signal and supplies the inverted signal to the NOR-gate 348, causing the latter to reset the shift register 350.

A bit-for-bit comparator 369 compares the Q signals from the zone-one flip-flop 334′ and the flip-flops 370, 372, etc., for the other zones, with stored values represented by a ground connection 374 indicating all Q's to be low. If any Q goes high, the comparator 369 produces an output signal which through an inverter 376 sets a flip-flop 378 connected to an alarm circuit 380 and a loudspeaker 382.

A silence switch 384 is provided, as is a reset button 386 connecting $V_{cc}$ to ground. The silence switch 384, so long as it remains open, silences the alarm, while the reset button 386, if pressed, silences the alarm but enables it to be reactivated in case of a continuing malfunction.

The preceding description in connection with FIG. 4 has been concerned primarily with zone 1, the supervision of which is illustrative. The supervision of the remaining zones 2, 3, etc., is the same and therefore will not be described in further detail. The four inputs $b_1$, $b_2$, $b_3$, $b_4$ to the decoder 320 permit a designation of up to 16 zones, since $2^4 = 16$. Circuitry for the supervision of the first three zones is illustrated in FIG. 4, and it is replicated in a manner clear from the preceding disclosure to provide for the supervision of the remaining zones.

We have been concerned primarily up to this point with a system in which there are two wires 30*a*, 30*b* connecting the transmitter and the various receiver-drivers and in which the audible signals employed are generated in the various receiver-drivers. It is also within the scope of the invention to employ any number of wires connecting the transmitter and the various receiver-drivers, for example, three such wires, and to generate the audible signals in the transmitter. These embodiments of the invention are disclosed in FIGS. 1B, 2C, 2D, 3D, 3E, and 3F.

FIG. 1B corresponds generally to FIG. 1A and shows an FACP 10 with its selector 12 and output lines 14, 16...*n;* and the SCSS control panel 24′ with its buffer 22, transmitter 26′ and power supply 28′. The power supply supplies power at 24 volts d.c. on a line 30*c*, and the transmitter 26′ sends data on a data command line 30*d*. A third common ground line 30*e* is also provided.

Figure 2C:
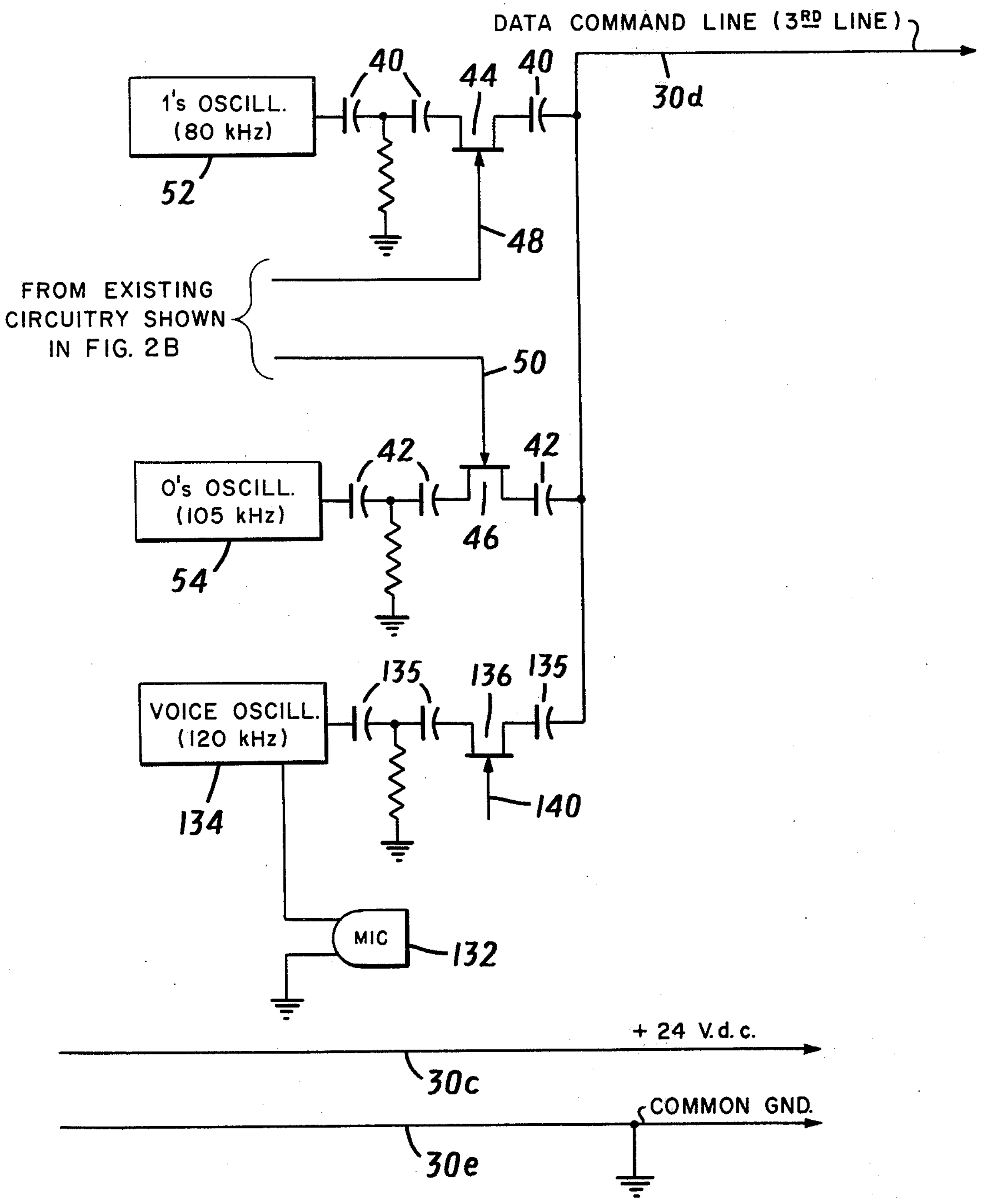
FIG. 2C is a block diagram showing an alternate embodiment of the portion of the transmitter shown in FIG. 2B, which is adapted for use in a three-wire rather than a two-wire system.

FIG. 2C shows how the oscillators 52, 54 and 134 are connected to the data command line 30*d* and also shows the d.c. power line 30*c* and the common ground line 30*e*, the remainder of the circuitry corresponding to FIGS. 2A and 2B.

Figure 2D:
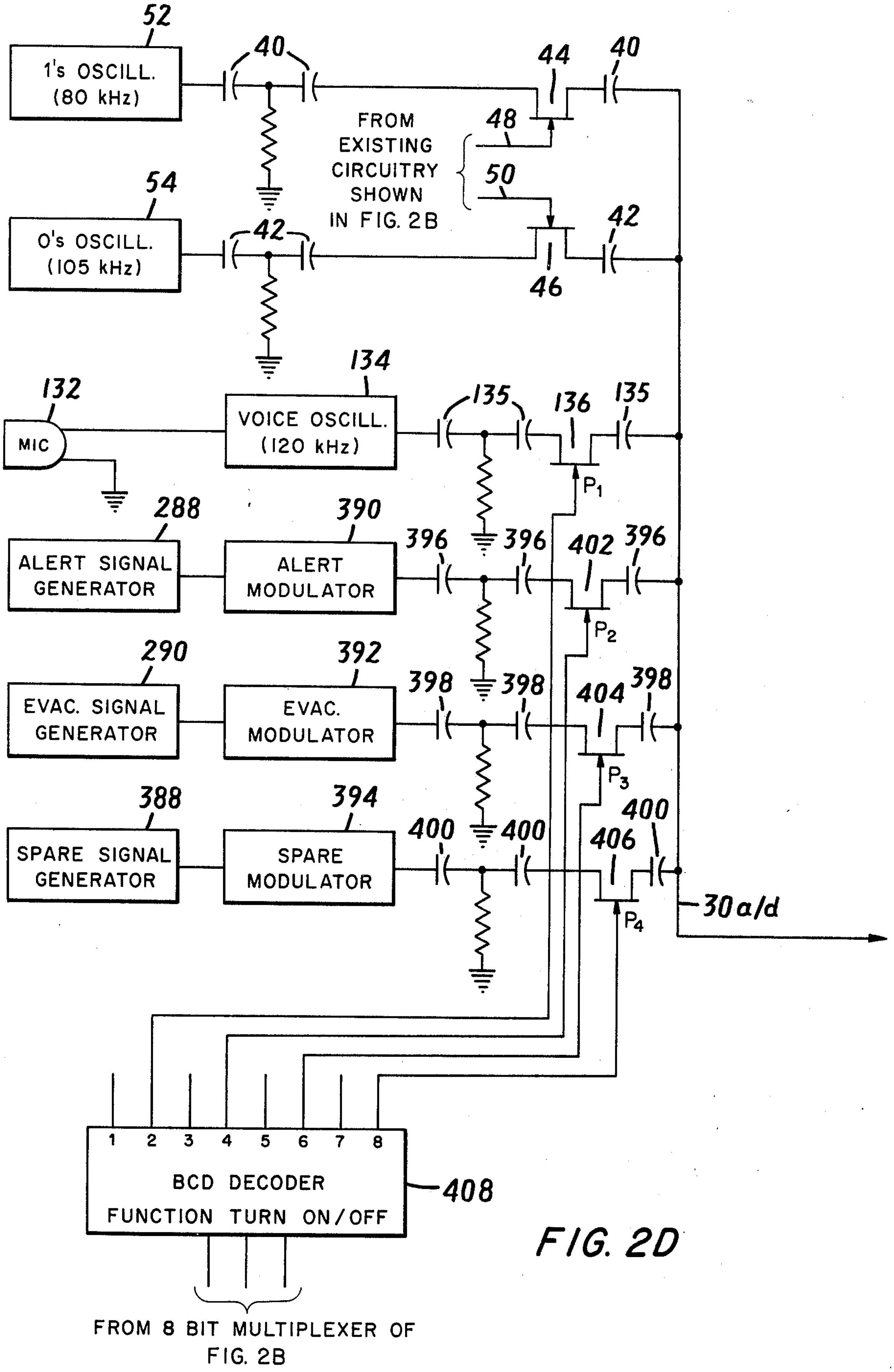
FIG. 2D is a block diagram showing an alternate embodiment of the portion of the transmitter shown in FIG. 2B, which is adapted for use in a two-wire or three-wire system wherein the audible signals employed are incorporated in the transmitter rather than in the receiver-drivers.

FIG. 2D shows appropriate modifications relating to transmitter-contained audible signals, whether the system is a two-wire system or a three-wire system. The circuitry associated with the oscillators 52, 54 and 134 is the same as that shown in FIGS. 2B and 2C. An "alert" signal generator 288 and an "evacuate" signal generator 290, which may be identical to those shown in FIG. 3C, are provided in the transmitter, together with a "spare" signal generator 388, the counterpart of which is not shown in FIG. 3C. These generators 288, 290 and 388 are connected to modulators 390, 392 and 394, respectively, the latter supplying outputs through coupling capacitors 396, 398 and 400, respectively, to a line 30*a* or 30*d*, depending on whether it is a two-wire or a three-wire system.

FET switches 402, 404 and 406 are in series between the modulators 390, 392 and 394, respectively, and the line 30*a/d*. The FET switch 136 plus the FET switches 402, 404 and 406 are controlled by pulses $P_1$, $P_2$, $P_3$, $P_4$, respectively, generated by a binary-coded-decimal-to-decimal decoder 408 in accordance with input signals $b_5$, $b_6$, $b_7$, the latter being generated by the ROM 98 (FIG. 2B). It will be recalled that these signals $b_5$, $b_6$, $b_7$, the last three pulses of the 8-bit word transmitted, end up in the first three positions of the shift register 166 (FIG. 3B) and designate the function to be performed in the zone designated by the signals $b_1$, $b_2$, $b_3$, $b_4$. The signals $P_1$, $P_2$, $P_3$, $P_4$ thus control the "on" and "off" modes of the oscillators 134, 390, 392 and 394, respectively, and the corresponding voice, "alert", "evacuate" and "spare" functions, in accordance with whether the signals are present or absent. The signals $P_1$, $P_2$, $P_3$, $P_4$ are generated in the second, fourth, sixth and eighth output positions of the decoder 408. Thus, all of the signals $P_1$ through $P_4$ may be off or absent, or one of them, but no more than one at a time, may be present.

Figure 3D:
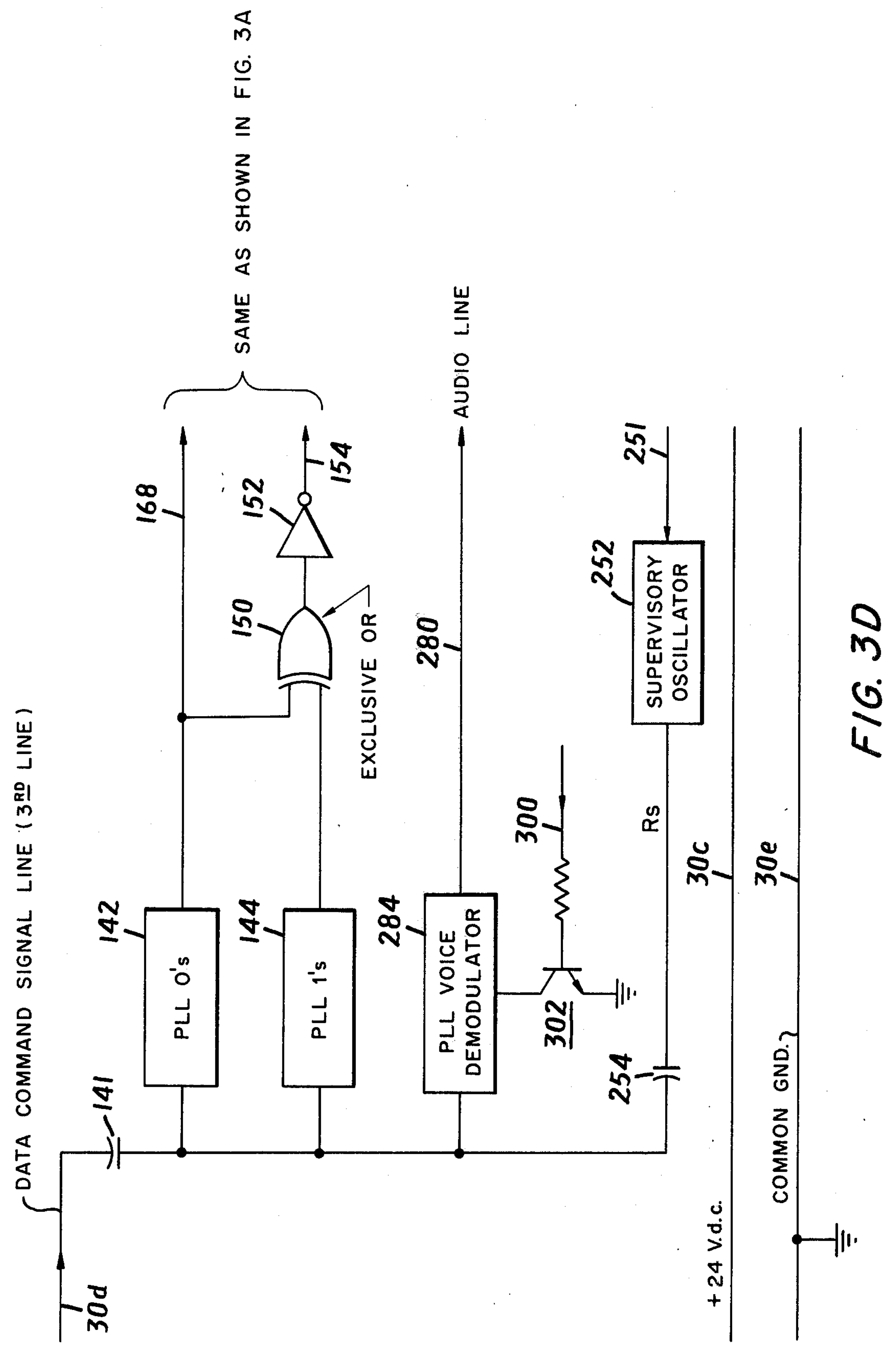
FIG. 3D is a block diagram showing an alternate embodiment of the portion of the typical receiver-driver shown in FIG. 3A, which is adapted for use in a three-wire rather than a two-wire system.

FIG. 3D shows modifications to a typical receiver-driver in the case where a three-wire system is used. The figure corresponds to FIG. 3A, which shows a two-wire system. The circuitry is essentially the same, except that, in FIG. 3D, the information is supplied on the data command signal line 30*d*, power is supplied on the 24 volt d.c. line 30*c* and a common ground 30*e* is provided.

Figure 3E:
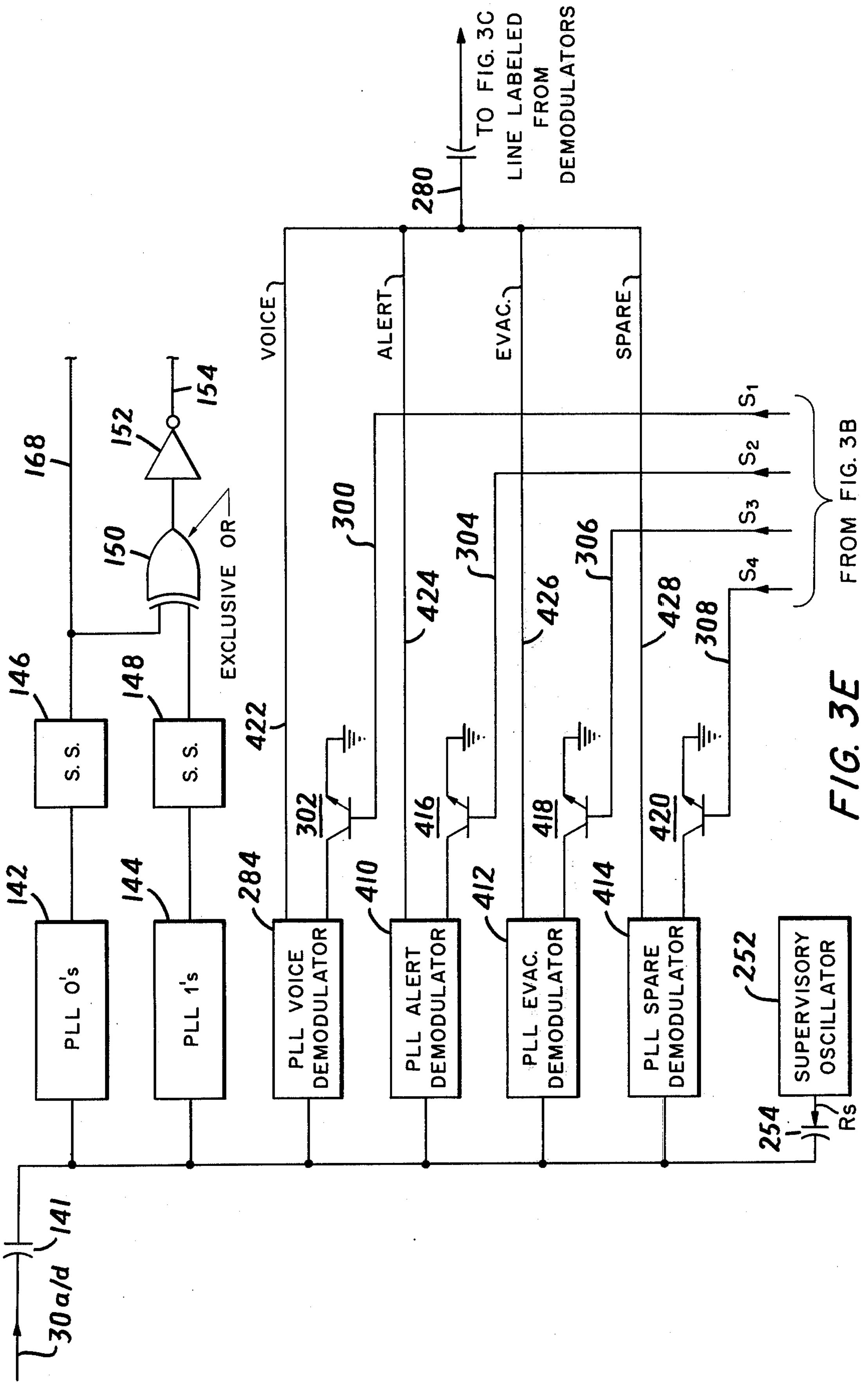
FIG. 3E is a block diagram showing an alternate embodiment of the portion of the typical receiver-driver shown in FIG. 3A, which is adapted for use in a two-wire or three-wire system wherein the audible signals employed are incorporated in the transmitter rather than in the receiver-drivers.

FIG. 3E discloses modifications appropriate to the case where the audible signals are generated in the transmitter. The phase-locked loops 142, 144 and 284 correspond to those shown in FIG. 3A. In addition, phase-locked loops 410, 412 and 414 are provided for demodulating the "alert," "evacuate," and "spare" signals received from the transmitter on the line 30*a/d*. They are gated on and off by transmitters 416, 418, 420, respectively.

As explained previously, the transistor 302 is controlled by the signal $S_1$ generated by the flip-flop 292 on the line 300. Similarly, the signals $S_2$, $S_3$, and $S_4$, generated by the flip-flops 294, 296 and 298, respectively, on the lines 304, 306 and 308, control the transistors 416, 418 and 420, so that the modulators 282, 410, 412 and 414 generate their respective outputs for the "voice," "alert," "evacuate" and "spare" functions on lines 422, 424, 426 and 428, respectively, which are commonly connected to the line 280 (FIG. 3C).

If transmitter-contained audible signals are employed, then the "alert" signal generator 288 and the "evacuate" signal generator 290 shown in FIG. 3C, together with their input leads 304 and 306 and their respective outputs, are, of course, omitted.

Figure 3F:
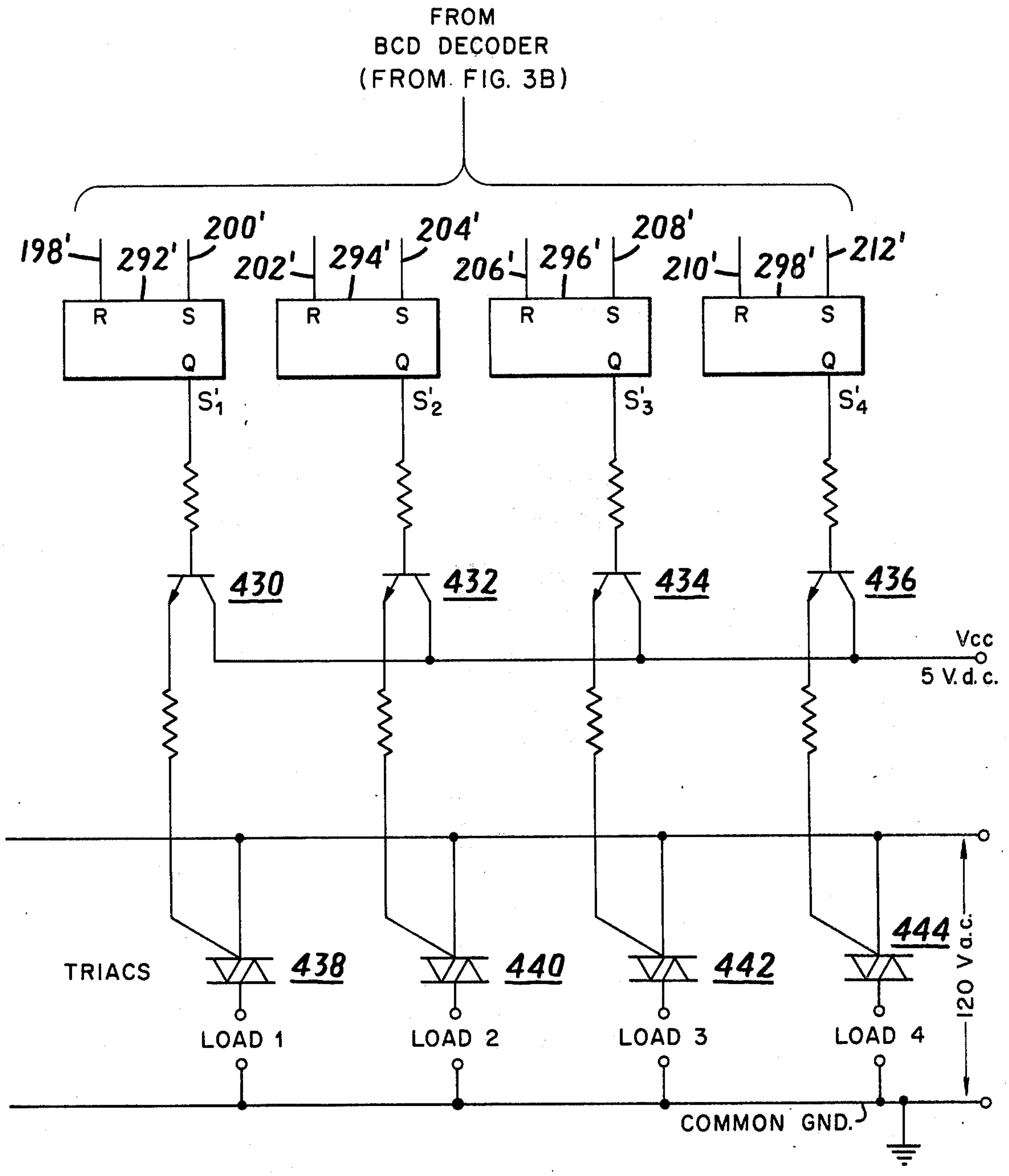
FIG. 3F is a block diagram showing an alternate embodiment of the portion of the typical receiver-driver shown in FIG. 3B, which is adapted for use in a system intended to perform various remote-switching functions.

FIG. 3F shows an embodiment in which a remote switch board is employed. In this case, all audio demodulators and amplifiers are eliminated. Flip-flops 292′,

UNITED STATES PATENT AND TRADEMARK OFFICE
CERTIFICATE OF CORRECTION

PATENT NO. : 3,964,047

DATED : June 15, 1976

INVENTOR(S) : Joseph C. Antonaccio

It is certified that error appears in the above-identified patent and that said Letters Patent are hereby corrected as shown below:

On the Cover Page, after [56] References Cited, "Friesen... 340/319 X" should read --Friesen...340/310 XR--; Col. 1, line 2, "COMMUNICATONS" should read --COMMUNICATIONS--; Col. 2, line 64, "(voide" should read --(voice--; Col. 3, line 46, "a" should read --the--; Col. 3, line 63, "Frequently" should read --Frequency--; Col. 3, line 65, "Frequently" should read --Frequency--; Col. 4, line 5, after "a" should be --single--; Col. 4, line 45, after "elements" should be --within--; Col. 4, line 58, "maufunction" should read --malfunction--; Col. 5, line 28, "KHz" should read --kHz--; Col. 6, line 43, "K" should read --$\overline{K}$--; Col. 7, line 43, " "on$^{\infty}$" should read -- "on" --; Col. 8, line 23, "K" should read --$\overline{K}$--; Col. 8, line 66, "138" should read --128--; Col. 8, line 67, "register" should read --resistor--; Col. 9, line 51, "on" should read --an--; Col. 10, line 49, "$b_3b_4$" should read --$b_3$, $b_4$--; Col. 10, line 58, "code" should read --coded--; Col. 11, line 14, "lins" should read --lines--; Col. 11, line 40, "the comparator" should read --a comparator--; Col. 13, line 56, "and" should read --the--; Col. 16, line 49, "transmitters" should read --transistors--; Col. 16, line 56, "modulators" should read --demodulators--; Col. 17, line 3, after "bases" should be --of--; Col. 17, line 29, "ane" should read --and--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,964,047

DATED : June 15, 1976

INVENTOR(S) : Joseph C. Antonaccio

It is certified that error appears in the above-identified patent and that said Letters Patent are hereby corrected as shown below:

On the Cover Page, after [56] References Cited, "Friesen... 340/319 X" should read --Friesen...340/310 XR--; Col. 1, line 2, "COMMUNICATONS" should read --COMMUNICATIONS--; Col. 2, line 64, "(voide" should read --(voice--; Col. 3, line 46, "a" should read --the--; Col. 3, line 63, "Frequently" should read --Frequency--; Col. 3, line 65, "Frequently" should read --Frequency--; Col. 4, line 5, after "a" should be --single--; Col. 4, line 45, after "elements" should be --within--; Col. 4, line 58, "maufunction" should read --malfunction--; Col. 5, line 28, "KHz" should read --kHz--; Col. 6, line 43, "K" should read --$\bar{K}$--; Col. 7, line 43, " "on$^{\infty}$ " should read -- "on" --; Col. 8, line 23, "K" should read --$\bar{K}$--; Col. 8, line 66, "138" should read --128--; Col. 8, line 67, "register" should read --resistor--; Col. 9, line 51, "on" should read --an--; Col. 10, line 49, "$b_3b_4$" should read --$b_3$, $b_4$--; Col. 10, line 58, "code" should read --coded--; Col. 11, line 14, "lins" should read --lines--; Col. 11, line 40, "the comparator" should read --a comparator--; Col. 13, line 56, "and" should read --the--; Col. 16, line 49, "transmitters" should read --transistors--; Col. 16, line 56, "modulators" should read --demodulators--; Col. 17, line 3, after "bases" should be --of--; Col. 17, line 29, "ane" should read --and--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*